(12) United States Patent
Mehlberg et al.

(10) Patent No.: US 11,517,869 B2
(45) Date of Patent: Dec. 6, 2022

(54) RISER EXTENSION APPARATUS AND PROCESS

(71) Applicant: UOP LLC, Des Plaines, IL (US)

(72) Inventors: Robert Mehlberg, Wheaton, IL (US); Michael A. Stine, Lake Zurich, IL (US); Lev Davydov, Northbrook, IL (US); Sathit Kulprathipanja, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/458,002

(22) Filed: Jun. 29, 2019

(65) Prior Publication Data
US 2020/0406208 A1    Dec. 31, 2020

(51) Int. Cl.
*B01J 8/18*   (2006.01)
*C10G 11/18*   (2006.01)
*B01J 8/00*   (2006.01)

(52) U.S. Cl.
CPC ............. *B01J 8/1845* (2013.01); *B01J 8/005* (2013.01); *B01J 8/0055* (2013.01); *B01J 8/1854* (2013.01); *B01J 8/1863* (2013.01); *C10G 11/182* (2013.01); *B01J 2208/00991* (2013.01); *C10G 2300/107* (2013.01); *C10G 2300/1077* (2013.01); *C10G 2300/301* (2013.01); *C10G 2300/706* (2013.01)

(58) Field of Classification Search
None
See application file for complete search history.

(56) References Cited

U.S. PATENT DOCUMENTS

| | | | | |
|---|---|---|---|---|
| 3,607,127 A | * | 9/1971 | Pfeiffer | ............... B01J 8/18 |
| | | | | 422/212 |
| 3,841,843 A | | 10/1974 | Williams | |
| 4,295,961 A | * | 10/1981 | Fahrig | ............... C10G 11/18 |
| | | | | 208/113 |
| 4,365,905 A | | 12/1982 | Fahrig | |
| 4,394,349 A | * | 7/1983 | Cartmell | ............... C10G 11/18 |
| | | | | 208/153 |

(Continued)

OTHER PUBLICATIONS

Jeff Knight, "Transforming the FCC for The Refinery of the Future", Honeywell UOP ME-TECH 2019 Pre-Conference Seminar, Saadiyat Island, Abu Dhabi (Feb. 26, 2019).

(Continued)

*Primary Examiner* — Jennifer A Leung
(74) *Attorney, Agent, or Firm* — Paschall & Associates, LLC; James C. Paschall (57) ABSTRACT

In an apparatus for fluid catalytic cracking a riser having a top and a bottom for fluidizing and cracking a hydrocarbon feed stream by contact with catalyst exits an outlet at the top of the riser. A downer in communication with the outlet of the riser receives cracked hydrocarbon product and catalyst. A swirl duct in communication with the downer has a discharge opening below the outlet for discharging said cracked hydrocarbon product and catalyst. A stream of hydrocarbon feed and a catalyst is passed upwardly in a riser. A stream of gaseous hydrocarbon products and catalyst is directedly downwardly and then the stream of gaseous hydrocarbon products and catalyst are directed to flow in an angular direction to separate gaseous hydrocarbon products from the catalyst.

13 Claims, 3 Drawing Sheets

(56) References Cited

U.S. PATENT DOCUMENTS

| | | | | |
|---|---|---|---|---|
| 4,591,427 | A | * | 5/1986 | Krug ..................... C10G 11/18 |
| | | | | 208/153 |
| 4,701,307 | A | * | 10/1987 | Walters ................. B01J 8/0055 |
| | | | | 208/161 |
| 4,756,886 | A | | 7/1988 | Pfeiffer |
| 5,316,657 | A | | 5/1994 | Zinke |
| 5,364,515 | A | | 11/1994 | Lomas et al. |
| 5,449,497 | A | | 9/1995 | Cetinkaya |
| 5,468,369 | A | * | 11/1995 | Muldowney ........... C10G 11/18 |
| | | | | 208/113 |
| 5,552,120 | A | | 9/1996 | Sechrist |
| 5,843,377 | A | * | 12/1998 | Fandel .................. B01J 8/0055 |
| | | | | 422/144 |
| 6,296,812 | B1 | | 10/2001 | Gauthier |
| 6,692,552 | B2 | | 2/2004 | Benham |
| 7,429,363 | B2 | | 9/2008 | Yuan |
| 7,594,994 | B1 | | 9/2009 | Seibert |
| 8,383,051 | B2 | | 2/2013 | Gbordzoe |
| 10,099,190 | B2 | | 10/2018 | Raboin |
| 2014/0001096 | A1 | | 1/2014 | Throndson et al. |

OTHER PUBLICATIONS

Intellectual Property India, Examination Report Under Sections 12 & 13 of the Patents Act for corresponding Indian Application No. 202117057439, dated Jun. 16, 2022.

\* cited by examiner

RISER EXTENSION APPARATUS AND PROCESS

FIELD

The field relates generally to a catalytic riser reactor, and more extending the residence time for a catalytic riser reactor.

BACKGROUND

Fluid catalytic cracking (FCC) is accomplished by contacting hydrocarbons in a riser reactor with a catalyst composed of finely divided particulate material. The reaction in catalytic cracking, as opposed to hydrocracking, is carried out in the absence of added hydrogen or the consumption of hydrogen. In the riser reactor, the hydrocarbon feed contacts the catalyst and is cracked into a product stream containing lighter hydrocarbons. A steam or gas stream may be used to accelerate catalyst in the riser before introduction of the feed. As the cracking reaction proceeds, substantial amounts of coke are deposited on the catalyst. The catalyst is regenerated at high temperatures by burning coke from the catalyst in a regeneration zone. Coke-containing catalyst, referred to as "spent catalyst", may be continually transported from the reaction zone to the regeneration zone to be regenerated and replaced by essentially coke-free regenerated catalyst from the regeneration zone. Fluidization of the catalyst particles by various gaseous streams facilitates the transport of catalyst between the reaction zone and regeneration zone.

Riser residence time is one of the leading factors that determines how effectively the heavy hydrocarbon feed is converted to lighter, more valuable hydrocarbon products. Increasing riser residence time increases the percentage of heavy hydrocarbon feed that is converted to lighter products. Unfortunately, increasing residence time can be very costly. Refiners who wish to increase riser residence time usually take one of two techniques to do so: (1) replacing an existing riser with a larger diameter riser, or (2) increasing the height of the reactor vessel to accommodate a taller riser as part of a larger revamp. Both of these techniques are costly. Increasing riser diameter requires existing parts be replaced and modifying feed and steam system piping to accommodate the larger riser diameter. Additionally, care must be taken maintain riser velocity when the riser diameter is increased to avoid negatively impacting flow profile and conversion. Increasing the height of the reactor vessel can be very costly if structure or foundation limits exist.

There remains a need for an effective and efficient design for increasing riser residence time.

SUMMARY

An apparatus and process for fluid catalytic cracking increases riser residence time without increasing riser diameter or the height of the apparatus. The apparatus and process utilize a riser having a top and a bottom for conveying a stream of hydrocarbons and catalyst to crack larger hydrocarbons to smaller hydrocarbons by contact with the catalyst. The stream of hydrocarbons and catalyst exits an outlet at the top of the riser while contacting of hydrocarbons with catalyst continues. A downer in communication with the outlet of the riser receives the stream of hydrocarbons and catalyst and directs the stream downwardly while continuing the cracking reaction. A curved duct in communication with the downer has a discharge opening below the outlet for discharging the cracked hydrocarbon product and catalyst causing their separation. The arrangement enables prolonging contact of the hydrocarbons and catalyst by extending the riser and/or extending contact in the downer without increasing riser diameter or overall height of the apparatus.

Additional objects, embodiments, and details of the invention are set forth in the following detailed description of the invention.

DETAILED DESCRIPTION

FCC risers that operate at higher velocities typically perform better than risers operating at slower velocities. However, slower riser operation is usually designed to limit the height of the riser while maintaining adequate residence time. Consequently, shorter risers are designed while sacrificing conversion and yield selectivity. We have discovered a riser extension that will not require adding any additional height to the riser. The riser extension comprises a downer at the top of the riser that continues contacting catalyst and hydrocarbon feed to continue the conversion to valuable products while the catalyst and hydrocarbon descend in the downer. A downer produces uniform catalyst density and velocity profiles, approaching plug flow. Maintaining such profiles is important in the FCC operation, especially at later stages of reaction in the upper zone of the riser. At the bottom of the downer, curved ducts discharge and impart angular momentum to the mixture of catalyst and product gas to effect separation of the two from each other. The riser extension enables operating the riser at higher residence time without increasing riser diameter which improves conversion while maintaining adequate residence time and manageable riser height. Indeed, the overall height of the apparatus of the present disclosure is not increased, so it can fit into an existing FCC apparatus.

Figures 1, 2, 3:
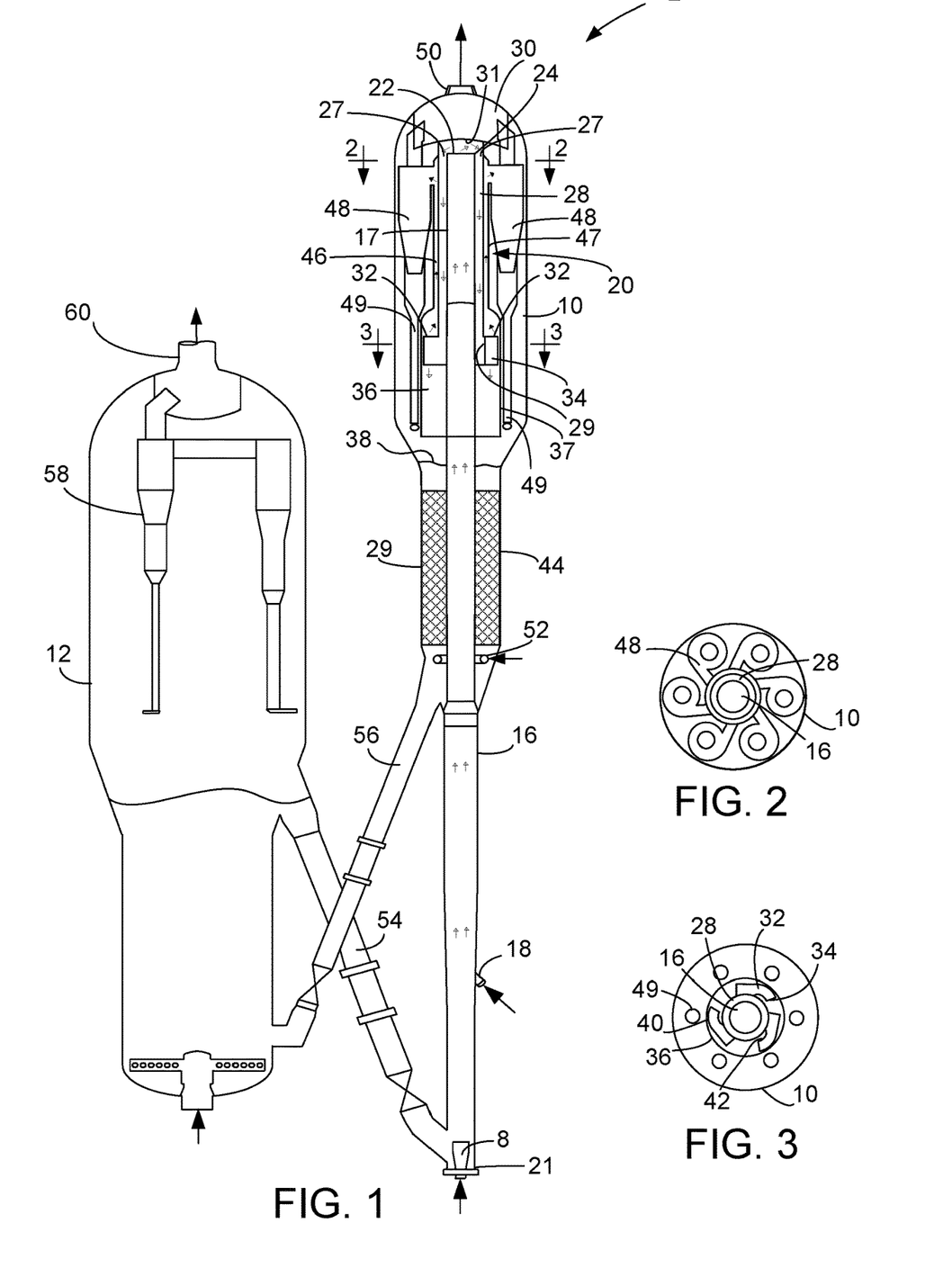
FIG. 1 is a schematic arrangement of a catalytic reactor.
FIG. 2 is a sectional view taken along segment 2-2 of FIG. 1.
FIG. 3 is a sectional view taken along segment 3-3 of FIG. 1

These and other benefits will be appreciated and understood more fully in the context of a catalytic reactor apparatus. The catalytic reactor may comprise an FCC apparatus 2 such as shown in FIG. 1. The catalytic reactor may comprise a reactor vessel 10, a regenerator vessel 12, and a reactor riser 16 that provides a pneumatic conveyance zone in which hydrocarbons are cracked to smaller hydrocarbons. The apparatus 2 circulates catalyst to contact feed in the manner hereinafter described.

The catalyst comprises any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst comprises a large pore zeolite, such as a Y-type zeolite, an active alumina material, a binder material, comprising either silica or alumina and an inert filler such as kaolin. A catalyst additive may comprise a medium or smaller pore zeolite catalyst exemplified by ZSM-5, ZSM-11, ZSM-12, ZSM-23, ZSM-35, ZSM-38, ZSM-48, and other similar materials. U.S. Pat. No. 3,702,886 describes ZSM-5.

FCC feedstocks, suitable for processing by this invention, include conventional FCC feeds and higher boiling or residual feeds. The most common of the conventional feeds is a vacuum gas oil which is typically a hydrocarbon material having an IBP of at least about 232° C. (450° F.), a T5 of between about 288° C. (550° F.) and about 392° C. (700° F.), typically no more than about 343° C. (650° F.), a T95 between about 510° C. (950° F.) and about 570° C. (1058° F.) and/or an EP of no more than about 626° C. (1158° F.) prepared by vacuum fractionation of atmospheric residue as determined by any standard gas chromatographic simulated distillation method such as ASTM D2887, D6352 or D7169, all of which are used by the petroleum industry. As used herein, the term "T5" or "T95" means the temperature at which 5 mass percent or 95 mass percent, respectively, of the sample boils using the ASTM D-86 or the "True Boiling Point" (TBP) method. As used herein, the term, TBP, means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio. As used herein, the term "initial boiling point" (IBP) means the temperature at which the sample begins to boil using ASTM D-7169, ASTM D-86 or TBP, as the case may be. As used herein, the term "end point" (EP) means the temperature at which the sample has all boiled off using ASTM D-7169, ASTM D-86 or TBP, as the case may be. The FCC process is suited best for feed stocks that are heavier than naphtha range hydrocarbons boiling above about 177° C. (350° F.).

Returning to FIG. 1, the reactor riser 16 provides a conveyance and conversion zone for conveying a stream of hydrocarbon feed and catalyst while cracking the hydrocarbon feed by contact with the catalyst. A hydrocarbon feed stream is introduced into the reactor riser 16 by one or more nozzles or distributors 18 between a bottom 21 of the reactor riser 16 and substantially upstream from an outlet 22 at a top 24 of the riser 16. A stream of regenerated catalyst is introduced to the riser from regenerator conduit 54. Fluidizing gas such as steam from distributor 8 fluidizes and lifts catalyst up to the feed distributors 18 where it contacts the hydrocarbon feed stream. The riser 16 conveys a mixed stream of the hydrocarbon feed and regenerated catalyst upwardly in the riser while catalytically cracking or converting the hydrocarbon feed to hydrocarbon products. The reactor riser 16 typically operates with dilute phase conditions above the point of feed injection wherein the density is usually less than 320 kg/m³ (20 lb/ft³) and, more typically, less than 160 kg/m³ (10 lb/ft³). Volumetric expansion resulting from the rapid vaporization of the feed as it enters the reactor riser 16 further decreases the density of the catalyst within the reactor riser 16 to typically less than 160 kg/m³ (10 lb/ft³). Before contacting the catalyst, the feed will ordinarily have a temperature in a range of from 149° C. (300° F.) to 316° C. (600° F.). Upward hollowhead arrows show the stream of hydrocarbon feed and catalyst ascending in the riser reactor 16. The riser extends through a disengaging chamber 36 that has an outer wall 37.

The stream of gaseous hydrocarbon products and spent catalyst may exit through the outlet 22 at the top 24 of the reactor riser 16. The reactor riser 16 may include a riser extension 17 that extends between a disengaging chamber 36 and the top 24 of the riser 16. In FIG. 1, the outlet is in the top 24 of the riser 16, but it may be from a window in the side of the riser at the top 24. The stream of catalyst and hydrocarbon feed are kept together while exiting the outlet 22 to continue the reaction and extend the residence time of the contact between the hydrocarbon feed and the catalyst. Hollowhead arrows show the stream of hydrocarbon feed and catalyst exiting the outlet 22 of the riser reactor.

The stream of hydrocarbon feed and catalyst are directed downwardly after exiting the riser reactor 16. All of the stream of catalyst and hydrocarbon feed are directed downwardly in an aspect. In the embodiment of FIG. 1, the bottom of a cyclone plenum 30 provides a reversal plate 31 to block upward transport and directs the stream of hydrocarbon feed and catalyst downwardly. In an aspect, the stream of catalyst and hydrocarbon feed are directed downwardly in a reactor downer 28. The stream of hydrocarbon feed and catalyst are received into the downer 28 through an entrance 27 at the top of the downer. Hollowhead arrows show the stream of hydrocarbon feed and catalyst descending downwardly. The downer 28 passes a mixed stream of the hydrocarbon feed and catalyst downwardly while continuing to catalytically crack or convert the hydrocarbon feed to hydrocarbon products because the catalyst and hydrocarbons are still in contact with each other. Contacting ultimately produces a stream of gaseous cracked hydrocarbon products and a collection of catalyst particles covered with substantial quantities of coke and generally referred to as "spent catalyst."

FIG. 2 is a cross-section of FIG. 1 taken at segment 2-2. FIG. 2 shows a relationship of the riser 16 with the downer 28. The stream of hydrocarbon feed and catalyst may be directed downwardly in the reactor downer 28 that is in downstream communication with the outlet 22 of the riser 16. The term "communication" means that fluid flow is operatively permitted between enumerated components, which may be characterized as "fluid communication". The term "downstream communication" means that at least a portion of fluid flowing to the subject in downstream communication may operatively flow from the object with which it fluidly communicates. The reactor downer 28 may be outside of the reactor riser 16. In the embodiment of FIG. 1, the reactor downer 28 comprises an annular conduit that is concentric with the riser reactor 16. To maintain the same velocity in the riser 16 and in the downer 28, the cross-sectional area of the downer may be the same as or greater than the cross-sectional area of the riser. An entire reactor 20 includes the reactor riser 16, the riser extension 17 and the reactor downer 28.

At the bottom off the downer 28, the downwardly directed stream of hydrocarbon feed and catalyst are mostly converted to gaseous hydrocarbon products and spent catalyst. The stream of gaseous hydrocarbon products and spent catalyst is subsequently directed to flow in an angular direction to separate the gaseous hydrocarbon products from the spent catalyst. In an embodiment, all of the stream of hydrocarbons and catalyst that exit the riser are directed to flow in an angular direction and separated into a cracked product vapor stream and a spent catalyst stream. Moreover, the angular direction may preferably be generally horizontal. A curved duct 32 in downstream communication with the downer 28 has a discharge opening 34 below said outlet 22 for discharging the stream of gaseous hydrocarbon products and spent catalyst. An exit 29 in the downer 28 is below the outlet 22 of the riser and the entrance 27 to the downer 28. The curved duct 32 may be in downstream communication with the exit 29. The downer 28 may have a plurality of curved ducts 32 for imparting angular momentum to the stream of gaseous hydrocarbon products and spent catalyst as it exits the discharge openings 34. Discharging the stream of gaseous hydrocarbon products and spent catalyst from the downer 28 through a curved duct 32 directs the stream of gaseous hydrocarbon products and spent catalyst to flow in an angular direction, preferably a generally horizontal angular direction. Hollow-headed arrows showing gaseous products ascending and catalyst descending from the discharge opening 34. Separation of gaseous hydrocarbon products from the catalyst terminates catalytic conversion of the hydrocarbons.

The embodiment of FIG. 1 extends the reactor riser 16 upwardly a substantial distance because the top 24 of the riser is raised to just below the plenum 30, above the cyclones 48 and the disengaging chamber 36. Conventionally, the top 24 of the riser 16 is located in the disengaging chamber 36 and the reaction terminated at the discharge openings 34 of curved ducts. The reactor riser 16 includes a riser extension 17 that extends to a top 24 that is above the cyclones 48 and/or the disengaging chamber 36. The use of the reactor downer 28 with the reactor riser 16 provides for a reactor 20 with additional length even doubling the length of the riser extension 17 by looping the reactor length back to the discharge openings in the disengaging chamber 36 by inclusion of the reactor downer 28. The longer reactor 20 comprising the reactor riser 16 and the reactor downer 28 may operate with a superficial gas velocity of more than 12 m/s (40 ft/s), preferably between about 14 m/s (45 ft/s) to about 21 m/s (70 ft/s) and preferably between about 17 m/s (55 ft/s) and about 20 m/s (65 ft/s) which can result in increasing conversion by about 1 to about 2 vol % for risers with internal diameters of at least 1.5 m (5 ft) compared to slower operating reactor risers of the same volume and residence time.

A stream of separated gaseous hydrocarbon products are passed adjacently to the riser 16 to a cyclone 48 which further separates catalyst particles from gases by centripetal acceleration. In an embodiment, gaseous products ascend up a gas recovery conduit 46 to be distributed to a cyclone 48 in which spent catalyst is further separated from product gases. Solid headed arrows show the upward movement of gaseous products in the gas recovery conduit 46. A plurality of cyclones 48 may be utilized. The cyclones 48 are in downstream communication with the outlet 22 via the gas recovery conduit 46 and remove remaining catalyst particles from the product vapor stream to reduce particle concentrations to very low levels. Diplegs 49 of cyclones 48 dispense separated catalyst particles into a dense catalyst bed 38 below the disengaging chamber 36. Hollow head arrows show the trajectory of separated gaseous hydrocarbon products ascending and separated spent catalyst descending from the discharge opening 34.

The disengaging chamber 36 comprises an outer wall 37 that serves to contain separated gaseous products by enveloping the riser 16 and directs upflowing gaseous products into the gas recovery conduit 46. The outer wall 37 of the disengaging chamber 36 and an outer shell 47 of the gas recovery conduit 46 may be unitary. The riser extension 17 of the riser 16 extends within the elevation of the gas recovery conduit 46. In an embodiment, the shell 47 of the gas recovery conduit 46 may be sized and configured to fit between existing cyclones 48, the plenum 30 and the disengaging chamber 36 to enable revamp to the process and/or apparatus of the present disclosure.

FIG. 3 is a cross-section of FIG. 1 taken at segment 3-3. The curved ducts 32 may be contained in the disengaging chamber 36 within the reactor vessel 10. The disengaging chamber 36 is in downstream communication with the discharge outlets 34. The swirl ducts 32 are curved by having a curved outer wall 40 and a curved inner wall 42 that enhance initial separation of spent catalyst from cracked product vapors by imparting a tangential velocity to the exiting mixture of catalyst and cracked product vapor. Centripetal acceleration causes the denser catalyst to gravitate toward a wall of the disengaging chamber 36, lose momentum and fall into a dense catalyst bed 38 below. Gaseous products ascend in the disengaging chamber 36. The diplegs 49 of the cyclones are disposed outside of the disengaging chamber 36.

A stripping section 44 may be situated below the disengaging chamber 36. Catalyst separated by the curved ducts 32 and discharged through the discharge openings 34 drops down into the dense bed 38 and eventually into the stripping zone 44. The gaseous product stream, comprising cracked hydrocarbons and some spent catalyst, exits the cyclones 48 through the plenum 30. The gaseous product stream may then exit a top of the reactor vessel 10 through an outlet 50 from the plenum 30.

The stripping zone 44 removes hydrocarbons entrained with the spent catalyst and hydrocarbons adsorbed on the surface of the catalyst by counter-current contact with an inert gas such as steam distributed from a distributor 52. Stripping internals such as baffles or structured packing may facilitate contact of the steam with the spent catalyst.

Spent, stripped catalyst is transported from the reactor vessel 10 to the regenerator vessel 12, for example, through a spent catalyst conduit 56 in downstream communication with the stripping zone 44. The rate of transportation of catalyst may be regulated by a control valve which may also be used to control the depth of the catalyst bed 38 in the stripping zone 44.

On the regeneration side of the process, the spent catalyst which is transferred to the regenerator vessel 12, via the conduit 56, undergoes a typical combustion of coke from the surface of the catalyst particles by contact with an oxygen-containing gas. The regenerator vessel 12 may be a combustor-type of regenerator, which may use hybrid turbulent bed-fast fluidized conditions in a high-efficiency regenerator vessel 12 for completely regenerating spent catalyst. However, other regenerator vessels and other flow conditions may be suitable.

The spent catalyst from the reactor vessel 10 usually contains carbon in an amount of from 0.2 to 2 wt-%, which is present in the form of coke. An oxygen-containing combustion gas, typically air, enters the regenerator 12 and is distributed by a distributor. The oxygen in the combustion gas contacts the spent catalyst and combusts carbonaceous deposits from the catalyst to regenerate the catalyst and generate flue gas. Cyclones 58 separate entrained catalyst from flue gas by centripetal acceleration and direct the flue gas to be exhausted from the regenerator outlet 60. Hot regenerated catalyst may be transported back to the reactor vessel 10 through a regenerated standpipe 54.

Figure 4:
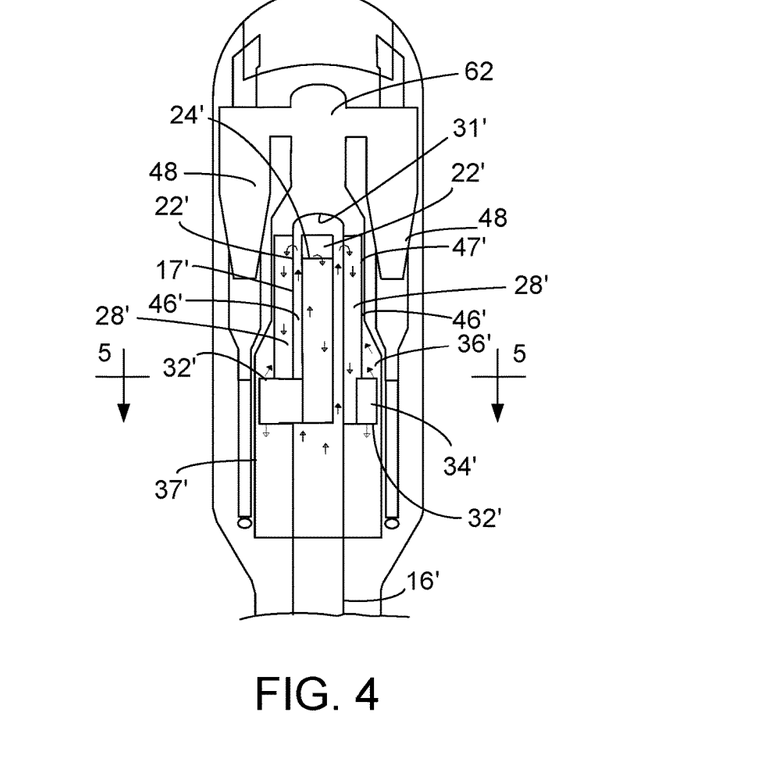
FIG. 4 is a partial schematic of an alternative embodiment of FIG. 1.

FIG. 4 illustrates an alternative embodiment from the embodiment of FIG. 1 which instead of utilizing an annular downer 28, makes use of a segmented downer tubes 28'. Many of the elements in FIG. 4 have the same configuration as in FIG. 1 and bear the same reference number. Elements in FIG. 4 that correspond to elements in FIG. 1 but have a different configuration bear the same reference numeral as in FIG. 1 but are marked with a prime symbol (').

In the embodiment of FIG. 4, the stream of hydrocarbon feed and catalyst transport up the riser reactor 16' and through a riser extension 17' which extends above the curved ducts 32 but not above the cyclones 48. The upward movement of the stream of hydrocarbon feed and catalyst in the riser 16' is shown by hollow headed upward arrows. The top 24' of the riser is surmounted by a reversal plate 31' which serves to contain the stream of hydrocarbon feed and catalyst and redirect the flow of the stream downwardly. The reversal plate 31' may be curved and define a hemispherical dome. The stream of hydrocarbon feed and catalyst exit the riser 16' through the outlet 22' which may comprise a window in the side of the riser 16' below the reversal plate 31'. In the embodiment of FIG. 4, the downer instead of being annular comprises a plurality of downer tubes 28'. Two to four downer tubes 28' may be used. In the embodiment of FIG. 4, the outlet 22' of the riser serves as the entrance to the downer tube 28'.

The downer tubes 28' receive the stream of hydrocarbon feed and catalyst and direct the stream downwardly as shown by hollow headed downward arrows. The downer tubes 28' direct the stream downwardly to the curved ducts 32' located below the outlet 22'. The curved ducts 32' which discharge the stream from discharge openings 34' in a tangential or angular direction imparting angular momentum to the stream of gaseous products and spent catalyst causing them to roughly separate due to centripetal acceleration. The angular direction may be generally horizontal. Streams of separated gaseous hydrocarbon products pass upwardly adjacent to the riser 16' and between respective ones of the plurality of downer tubes 28'. Solid headed arrows show the upward movement of separated gaseous products from the discharge openings 34'. The aggregate cross-sectional area of the downer tubes 28' may be greater than or equal to the cross-sectional area of the riser 16'. The downer tubes 28' define gas recovery passages 46' between adjacent downer tubes outside of said riser 16' to enable separated gaseous products to ascend to the cyclones 48. The disengaging chamber 36' comprises an outer wall 37' that serves to contain separated gaseous products by enveloping the riser 16', the downer tubes 28' and directs upflowing gaseous products into the gas recovery passages 46'. An outer shell 47' of the gas recovery passage 46' may be sized to fit within existing cyclones 48 in a revamp. The outer wall 37' of the disengaging chamber 36' and an outer shell 47' of the gas recovery passages 46' may be unitary. The riser extension 17' of the riser 16' extends within the elevation of the gas recovery passage 46'. The gas recovery passages 46' may all feed into a cyclone distribution chamber 62 located above a top 24' of the riser 16' and the reversal plate 31'. The cyclone distribution chamber 62 feeds all of the cyclones 48. All of the streams of separated gaseous hydrocarbon products are passed to the cyclone distribution chamber 62 which distributes the separated gaseous hydrocarbon products to the cyclones 48 for further catalyst removal.

Figure 5:
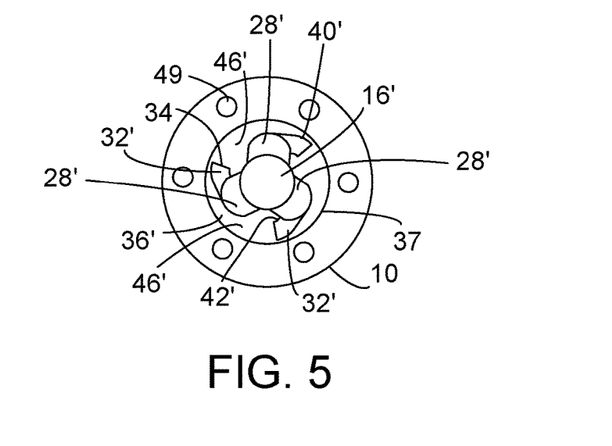
FIG. 5 is a sectional view taken along segment 5-5 of FIG. 4.

FIG. 5 is a cross-section of FIG. 2 taken at segment 5-5. FIG. 5 shows the relation of the riser 16' and the downer tubes 28' with each other. The stream of gaseous hydrocarbon products and spent catalyst exiting the outlet 22' of the riser 16' may be directed downwardly in a reactor downer tubes 28' that are in downstream communication with the riser 16'. The reactor downer tubes 28' may be radially outside of the reactor riser 16'. In the embodiment of FIG. 4, the reactor downer tubes 28' are arranged evenly spaced concentrically around the riser reactor 16'. To maintain the same velocity in the riser 16' and in the downer 28', the cross-sectional area of the downer tubes 28' may aggregately be at least as much as the cross-sectional area of the riser. The stream of gaseous hydrocarbon products and spent catalyst discharge from the downer tubes 28' from curved ducts 32' through discharge openings 34' within the disengagement chamber 36'. The curved ducts 32' have a curved outer wall 40' and a curved inner wall 42' that impart an angular trajectory to the stream of gaseous hydrocarbon products and spent catalyst discharged from the discharge openings 34'. The angular discharge effects a separation of gaseous hydrocarbon products from the spent catalyst. The separated gaseous hydrocarbon product stream ascends upwardly through gas recovery passages 46' in the disengaging chamber 36' between the downer tubes 28' and a wall 37 of the disengaging chamber 36' while the separated spent catalyst descends to the dense catalyst bed.

Figure 6:
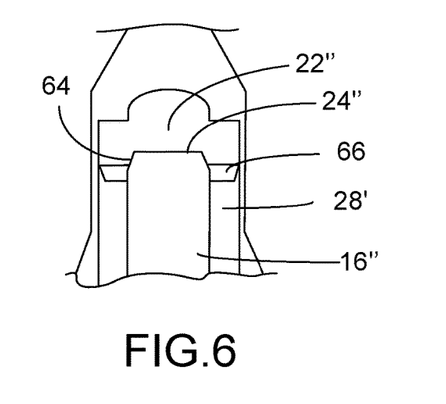
FIG. 6 is an enlarged partial view of a portion of FIG. 4.

FIG. 6 is an enlarged partial view of a portion of FIG. 4 in which the riser 16" has a tapered top end 64. Many of the elements in FIG. 6 have the same configuration as in FIG. 4 and bear the same reference number. Elements in FIG. 6 that correspond to elements in FIG. 4 but have a different configuration bear the same reference numeral as in FIG. 4 but are marked with a double prime symbol (").

The top edge 64 of the top 24" of the riser 16' is tapered inwardly at the outlet 22" and at the inlet to the downer tubes 28' to prevent erosion in the vicinity. The tapered top edge 64 gives more vertical space to make the 180 degree turn and will accelerate the upflowing stream to increase the upward momentum to provide a more uniform horizontal flow profile while turning downwardly. In an embodiment, an inwardly sloped baffle 66 may also be installed on the outer wall of the downer tubes 28' to further render the flow horizontal flow profile uniform.

Figures 7, 8:
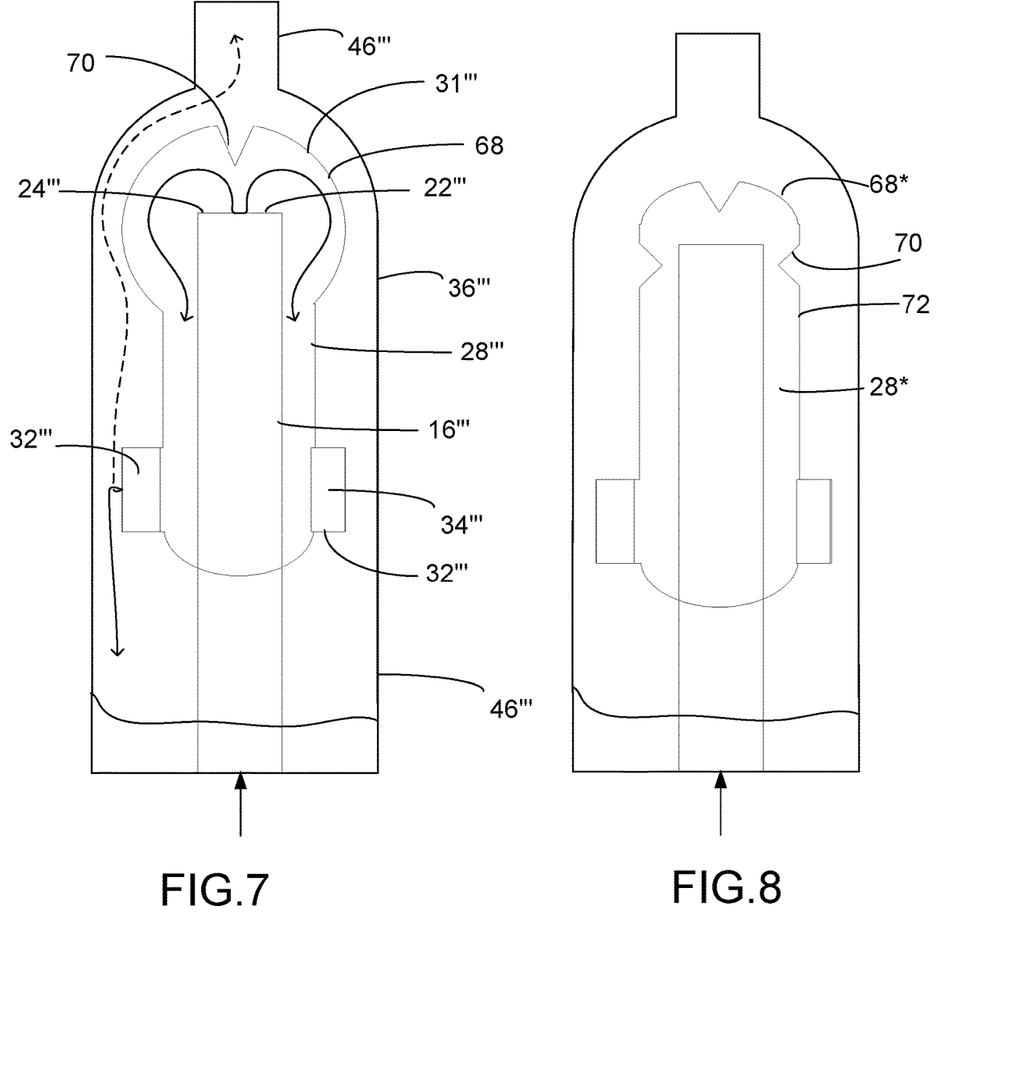
FIG. 7 is an alternative partial view of a portion of FIG. 1.
FIG. 8 is an alternative embodiment of FIG. 7.

FIG. 7 is a partial view of an alternative disengagement chamber 36''' of FIG. 1 in which the reversal plate 31''' of the riser 16''' is curved or spherical to gradually transition the upflow of the stream of catalyst and hydrocarbons from the riser 16''' to the downflow of the stream in the downer 28'''. Many of the elements in FIG. 7 have the same configuration as in FIG. 1 and bear the same reference number. Elements in FIG. 7 that correspond to elements in FIG. 1 but have a different configuration bear the same reference numeral as in FIG. 1 but are marked with a triple prime symbol ('''). The reversal plate 31''' is part of a curved or spherical top 68 of the downer 28'''. An impingement cone 70 may project inwardly from the spherical reversal plate 31''' toward an outlet 22''' of the riser 16''' to initiate redirecting the stream of hydrocarbon feed and catalyst from upflow to downflow as shown by arrows starting at the riser outlet 22''' and curving upwardly and then downwardly. The stream of hydrocarbons and catalyst discharged from the outlet 22''' in the top 24''' of the riser 16''' descends in the annular downer 28'''. A stream of gaseous products and spent catalyst and is then discharged from discharge openings 34''' in curved ducts 32''' in a tangential direction, preferably generally horizontally, to separate the gaseous products shown by a dashed arrow from the spent catalyst shown as a solid arrow by centripetal acceleration. The separated gaseous product stream ascends in the disengagement chamber 36''' to the gas recovery conduit 46'''. Everything else in FIG. 8 is configured and operates as in the embodiment of FIG. 7.

FIG. 8 is another embodiment of FIG. 7. Many of the elements in FIG. 8 have the same configuration as in FIG. 7 and bear the same reference number. Elements in FIG. 7 that correspond to elements in FIG. 8 but have a different configuration bear the same reference numeral as in FIG. 1 but are marked with an asterisk symbol (*). In the embodiment of FIG. 8, the top 68* of the downer 28* is reduced in size to be hemispherical and to have an outer diameter equivalent to the diameter of the downer 28*. The downer 28* may be provided with an inwardly directed baffle 70 on its outer wall 72 to direct catalyst away from the outer wall of the downer 28*. Everything else in FIG. 8 is configured and operates as the embodiment of FIG. 7.

The disclosed apparatus and process enables prolonging contact of the hydrocarbons and catalyst by extending the riser and/or extending contact in the downer without increasing riser diameter or the overall height of the apparatus.

SPECIFIC EMBODIMENTS

While the following is described in conjunction with specific embodiments, it will be understood that this description is intended to illustrate and not limit the scope of the preceding description and the appended claims.

A first embodiment of the disclosure is a process for fluidized catalytic cracking, comprising passing a stream of hydrocarbon feed and a catalyst upwardly in a riser while catalytically converting the hydrocarbon feed to hydrocarbon products; directing the stream downwardly while catalytically converting the hydrocarbon feed to hydrocarbon products to produce a stream of gaseous hydrocarbon products and catalyst; directing the stream of gaseous hydrocarbon products and catalyst to flow in an angular direction to separate the gaseous hydrocarbon products from the catalyst. An embodiment of the disclosure is one, any or all of prior embodiments in this paragraph up through the first embodiment in this paragraph further comprising directing all of the stream of gaseous hydrocarbon products and catalyst to flow in an angular direction. An embodiment of the disclosure is one, any or all of prior embodiments in this paragraph up through the first embodiment in this paragraph further comprising directing the stream of gaseous hydrocarbon products and catalyst downwardly in a downer. An embodiment of the disclosure is one, any or all of prior embodiments in this paragraph up through the first embodiment in this paragraph further comprising discharging the stream of gaseous hydrocarbon products and catalyst from the downer through a curved duct to direct the stream of gaseous hydrocarbon products and catalyst to flow in a generally horizontal angular direction. An embodiment of the disclosure is one, any or all of prior embodiments in this paragraph up through the first embodiment in this paragraph further comprising passing a stream of separated gaseous hydrocarbon products adjacently to the riser to be further separated in a cyclone. An embodiment of the disclosure is one, any or all of prior embodiments in this paragraph up through the first embodiment in this paragraph further comprising directing the stream of gaseous hydrocarbon products and catalyst downwardly in a plurality of downer tubes. An embodiment of the disclosure is one, any or all of prior embodiments in this paragraph up through the first embodiment in this paragraph further comprising discharging streams of gaseous hydrocarbon products and catalyst from each downer through respective curved ducts and passing streams of separated gaseous hydrocarbon products adjacently to the riser between respective ones of the plurality of downer tubes. An embodiment of the disclosure is one, any or all of prior embodiments in this paragraph up through the first embodiment in this paragraph further comprising passing all of said stream of separated gaseous hydrocarbon products to a cyclone distribution chamber and distributing said separated gaseous hydrocarbon products to a plurality of cyclones.

A second embodiment of the disclosure is an apparatus for fluid catalytic cracking comprising a riser having a top and a bottom for conveying a stream of hydrocarbons and catalyst to crack the hydrocarbon by contact with catalyst; an outlet at the top of the riser; a downer in communication with the outlet of the riser for receiving the stream of hydrocarbons with catalyst; a curved duct in communication with the downer, the curved duct having a discharge opening below the outlet for discharging the stream of gaseous hydrocarbon products and catalyst. An embodiment of the disclosure is one, any or all of prior embodiments in this paragraph up through the second embodiment in this paragraph further comprising an exit in the downer below the outlet and the curved duct in communication with the exit. An embodiment of the disclosure is one, any or all of prior embodiments in this paragraph up through the second embodiment in this paragraph wherein the downer is outside of the riser. An embodiment of the disclosure is one, any or all of prior embodiments in this paragraph up through the second embodiment in this paragraph wherein the cross-sectional area of the downer is greater than or equal to the cross-sectional area of the riser. An embodiment of the disclosure is one, any or all of prior embodiments in this paragraph up through the second embodiment in this paragraph further comprising a plurality of downer tubes with an aggregate cross-sectional area that is greater than or equal to the cross-sectional area of the riser. An embodiment of the disclosure is one, any or all of prior embodiments in this paragraph up through the second embodiment in this paragraph further comprising a plurality of downer tubes and a gas recovery passages adjacent to the plurality of downer tubes outside of the riser to enable separated gaseous products to ascend to cyclones. An embodiment of the disclosure is one, any or all of prior embodiments in this paragraph up through the second embodiment in this paragraph further comprising a cyclone distribution chamber in communication with the product recovery passages. An embodiment of the disclosure is one, any or all of prior embodiments in this paragraph up through the second embodiment in this paragraph wherein the downer has a curved top above an outlet at the top of the riser. An embodiment of the disclosure is one, any or all of prior embodiments in this paragraph up through the second embodiment in this paragraph further comprising a cone projecting into the downer from the curved top. An embodiment of the disclosure is one, any or all of prior embodiments in this paragraph up through the second embodiment in this paragraph wherein the downer comprises an annular conduit to the riser. An embodiment of the disclosure is one, any or all of prior embodiments in this paragraph up through the second embodiment in this paragraph wherein a top edge of the riser is tapered inwardly at the outlet to the downer. An embodiment of the disclosure is one, any or all of prior embodiments in this paragraph up through the second embodiment in this paragraph further comprising an annular baffle tapered inwardly from an outer wall of the downer.

A third embodiment of the disclosure is an apparatus for fluid catalytic cracking comprising a riser having a top and a bottom for conveying a stream of hydrocarbons and catalyst to crack the hydrocarbon by contact with catalyst; a plurality of outlets at the top of the riser; a plurality of downer tubes each corresponding to a respective one of the outlets, each downer tube in communication with a respective one of the outlets of the riser for receiving the stream of hydrocarbons and catalyst; a plurality of curved ducts each in communication with a respective one of the downers, the curved ducts each having a discharge opening below the outlet for discharging the stream of hydrocarbons and catalyst; and a product recovery passage adjacent to the downer tubes outside of the riser to enable separated gaseous products to ascend to cyclones.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An apparatus for fluid catalytic cracking comprising:
a riser having a top and a bottom for conveying a stream of hydrocarbons and catalyst to crack said hydrocarbons by contact with said catalyst;
an outlet at the top of the riser;
a reversal plate surmounting a top of said riser to block upward transport and direct the stream of hydrocarbons and catalyst downwardly;
a downer in communication with the outlet of the riser for receiving said stream of hydrocarbons and catalyst, said downer is outside of said riser, wherein said downer comprises an annular downer or a plurality of downer tubes;
a curved duct in downstream communication with said downer at the bottom of said downer, said curved duct having a discharge opening below said outlet for discharging a stream of gaseous hydrocarbon products and catalyst.

2. The apparatus of claim 1 further comprising an exit in the downer below the outlet and said curved duct in communication with said exit.

3. The apparatus of claim 1 wherein the downer comprises said annular downer and a cross sectional area of said downer is greater than or equal to a cross-sectional area of said riser.

4. The apparatus of claim 1 wherein the downer comprises said plurality of downer tubes with an aggregate cross-sectional area that is greater than or equal to a cross-sectional area of said riser.

5. The apparatus of claim 1 wherein the downer comprises said plurality of downer tubes and further comprising a gas recovery passage adjacent to said plurality of downer tubes outside of said riser to enable separated gaseous products to ascend to cyclones.

6. The apparatus of claim 5 further comprising a cyclone distribution chamber in communication with said gas recovery passage.

7. The apparatus of claim 1 wherein said downer has a curved top above said outlet at the top of the riser.

8. The apparatus of claim 7 further comprising a cone projecting into the downer from the curved top.

9. The apparatus of claim 1 wherein said downer comprises said annular downer formed by a conduit surrounding the riser.

10. The apparatus of claim 1 wherein a top edge of the riser is tapered inwardly at the outlet to the downer.

11. An apparatus for fluid catalytic cracking comprising:
a riser having a top and a bottom for conveying a stream of hydrocarbons and catalyst to crack said hydrocarbons by contact with said catalyst;
a plurality of outlets at the top of the riser;
a plurality of downer tubes each corresponding to a respective one of said outlets, each downer tube in communication with a respective one of said outlets of the riser for receiving said stream of hydrocarbons and catalyst;
a plurality of curved ducts each in downstream communication with a respective one of said downer tubes at the bottom of said downer tubes, said curved ducts each having a discharge opening below said plurality of outlets for discharging said stream of hydrocarbons and catalyst; and
a product recovery passage adjacent to said downer tubes outside of said riser to enable separated gaseous products to ascend to cyclones, the product recovery passage comprises a plurality of gas recovery passages;
wherein said riser extends to the top within a reactor vessel through a disengaging chamber which contains said plurality of curved ducts.

12. The apparatus of claim 11 wherein said plurality of downer tubes have an aggregate cross-sectional area that is greater than or equal to a cross-sectional area of said riser.

13. The apparatus of claim 11 further comprising a cyclone distribution chamber in communication with said plurality of gas recovery passages.

* * * * *